US012655772B2

(12) United States Patent
Cruz Martinez et al.

(10) Patent No.: US 12,655,772 B2
(45) Date of Patent: Jun. 16, 2026

(54) THERMOCOUPLE SUPPORT ASSEMBLY FOR A GAS TURBINE CASING

(71) Applicant: GE Vernova Infrastructure Technology LLC, Greenville, SC (US)

(72) Inventors: Rodolfo Cruz Martinez, Queretaro (MX); Alberto Rico Moya, Queretaro (MX); Cristobal Rafael Ochoa Lopez, Queretaro (MX)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 720 days.

(21) Appl. No.: 18/086,730

(22) Filed: Dec. 22, 2022

(65) Prior Publication Data

US 2024/0209749 A1     Jun. 27, 2024

(51) Int. Cl.
| | |
|---|---|
| *F01D 21/00* | (2006.01) |
| *G01K 1/02* | (2021.01) |
| *G01K 1/08* | (2021.01) |
| *G01K 1/14* | (2021.01) |
| *G01K 7/02* | (2021.01) |

(52) U.S. Cl.
CPC ........... *F01D 21/003* (2013.01); *G01K 1/026* (2013.01); *G01K 1/08* (2013.01); *G01K 1/14* (2013.01); *G01K 7/02* (2013.01); *F05D 2220/32* (2013.01); *F05D 2260/80* (2013.01); *G01K 7/023* (2013.01)

(58) Field of Classification Search
CPC   G01K 1/026; G01K 1/08; G01K 1/14; G01K 7/02; G01K 7/023; F01D 21/003; F05D 2220/32; F05D 2260/80; F05D 2220/30

USPC ................................ 374/208, 141, 179, 144
See application file for complete search history.

(56) References Cited

U.S. PATENT DOCUMENTS

| | | | | |
|---|---|---|---|---|
| 4,132,114 A | * | 1/1979 | Shah | G01K 1/14 |
| | | | | 374/E1.018 |
| 5,460,041 A | * | 10/1995 | Andes | G01M 3/002 |
| | | | | 73/335.08 |
| 5,678,926 A | | 10/1997 | Stansfeld et al. | |
| 6,761,480 B2 | | 7/2004 | Parnicza et al. | |
| 8,039,729 B2 | | 10/2011 | Nguyen | |
| 2005/0218887 A1 | * | 10/2005 | Twerdochlib | G01B 7/14 |
| | | | | 324/207.16 |
| 2016/0090860 A1 | * | 3/2016 | Schleif | F01D 25/04 |
| | | | | 415/119 |

(Continued)

FOREIGN PATENT DOCUMENTS

| | | |
|---|---|---|
| CN | 208633883 U | 3/2019 |
| CN | 210953148 U | 7/2020 |

(Continued)

*Primary Examiner* — Mirellys Jagan
(74) *Attorney, Agent, or Firm* — Dority & Manning, P.A.

(57) ABSTRACT

A thermocouple support assembly is provided. The thermocouple support assembly is configured to mount on a gas turbine casing. The thermocouple support assembly includes a thermocouple and a support plate. The thermocouple includes a protective sheath. The protective sheath extends from a connection end to a junction end. The support plate includes an outer surface and an inner surface and defines an aperture that extends between the outer surface and the inner surface. The protective sheath extends through the aperture such that the junction end is flush with the inner surface of the support plate.

18 Claims, 5 Drawing Sheets

(56)  References Cited

U.S. PATENT DOCUMENTS

2016/0139029 A1*  5/2016  Belsom ..................... G01L 7/00
                                                              422/53
2023/0030690 A1*  2/2023  Gebhardt ............... G01K 7/427

FOREIGN PATENT DOCUMENTS

| GB | 2300270 | A | 10/1996 |
| JP | 3049162 | U | 6/1998 |
| KR | 19990007755 | U | 2/1999 |
| KR | 200151865 | Y1 | 7/1999 |
| KR | 100859631 | B1 | 9/2008 |
| KR | 100868525 | B1 | 11/2008 |
| KR | 200448167 | Y1 | 3/2010 |
| MX | 2007011993 | A | 11/2007 |

* cited by examiner

THERMOCOUPLE SUPPORT ASSEMBLY FOR A GAS TURBINE CASING

FIELD

The present disclosure relates generally to a thermocouple support assembly. Particularly, the present disclosure relates generally to a thermocouple support assembly for a gas turbine casing.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Turbomachines are one example of high-temperature applications in which thermocouples are utilized to measure temperatures. Thermocouples are generally utilized to monitor temperatures and are generally formed by creating a junction (typically via welding) between two solid metals (e.g., wires). Exposure of this junction to heat generates an electromagnetic field that is proportional to the temperature. Accordingly, the temperature and fluctuations thereof can be calculated with high accuracy.

Thermocouples may be used to monitor the temperature of the gas turbine casing, which houses the compressor, the combustion cans, and the turbine. Typically, thermocouples used for monitoring the temperature of the gas turbine casing may be inserted into a counterbore defined through the casing. Alternatively, the thermocouples may include a threaded tip, which may be threadably inserted and coupled to a corresponding hole in the gas turbine casing.

However, gas turbine engines generally experience a large amount of vibrations during operation, which are translated into the gas turbine casing, and which can cause damage to the tips of the thermocouples. Additionally, these vibrations may cause the thermocouples to back out of the holes in which the thermocouples are inserted, thereby breaking contact between the thermocouple and the casing, which results in measurement errors. The thermocouples cannot be fixedly coupled to the gas turbine casing (e.g., via direct welding) because the thermocouples must be removed, replaced, and/or inspected throughout the life of the gas turbine.

Accordingly, an improved apparatus for supporting thermocouples on a gas turbine casing is desired and would be appreciated in the art.

BRIEF DESCRIPTION

Aspects and advantages of the turbomachines and thermocouple support assemblies in accordance with the present disclosure will be set forth in part in the following description, or may be obvious from the description, or may be learned through practice of the technology.

In accordance with one embodiment, a turbomachine is provided. The turbomachine includes a compressor that is disposed in a compressor section, a turbine that is disposed in a turbine section, and a combustion section disposed between the compressor section and the turbine section. The turbomachine further includes a gas turbine casing at least partially housing the compressor and the turbine. The gas turbine casing defines an exterior surface. The turbomachine further includes a thermocouple support assembly coupled to the exterior surface of the gas turbine casing. The thermocouple support assembly includes a thermocouple and a support plate. The thermocouple includes a protective sheath. The protective sheath extends from a connection end to a junction end. The support plate includes an outer surface and an inner surface and defines an aperture that extends between the outer surface and the inner surface. The protective sheath extends through the aperture such that the junction end is flush with the inner surface of the support plate.

In accordance with another embodiment, a thermocouple support assembly is provided. The thermocouple support assembly is configured to mount on a gas turbine casing. The thermocouple support assembly includes a thermocouple and a support plate. The thermocouple includes a protective sheath. The protective sheath extends from a connection end to a junction end. The support plate includes an outer surface and an inner surface and defines an aperture that extends between the outer surface and the inner surface. The protective sheath extends through the aperture such that the junction end is flush with the inner surface of the support plate.

These and other features, aspects and advantages of the present turbomachines and thermocouple support assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present turbomachines and thermocouple support assemblies, including the best mode of making and using the present systems and methods, directed to one of ordinary skill in the art, is set forth in the specification, which makes reference to the appended figures, in which.

DETAILED DESCRIPTION

Figure 1:
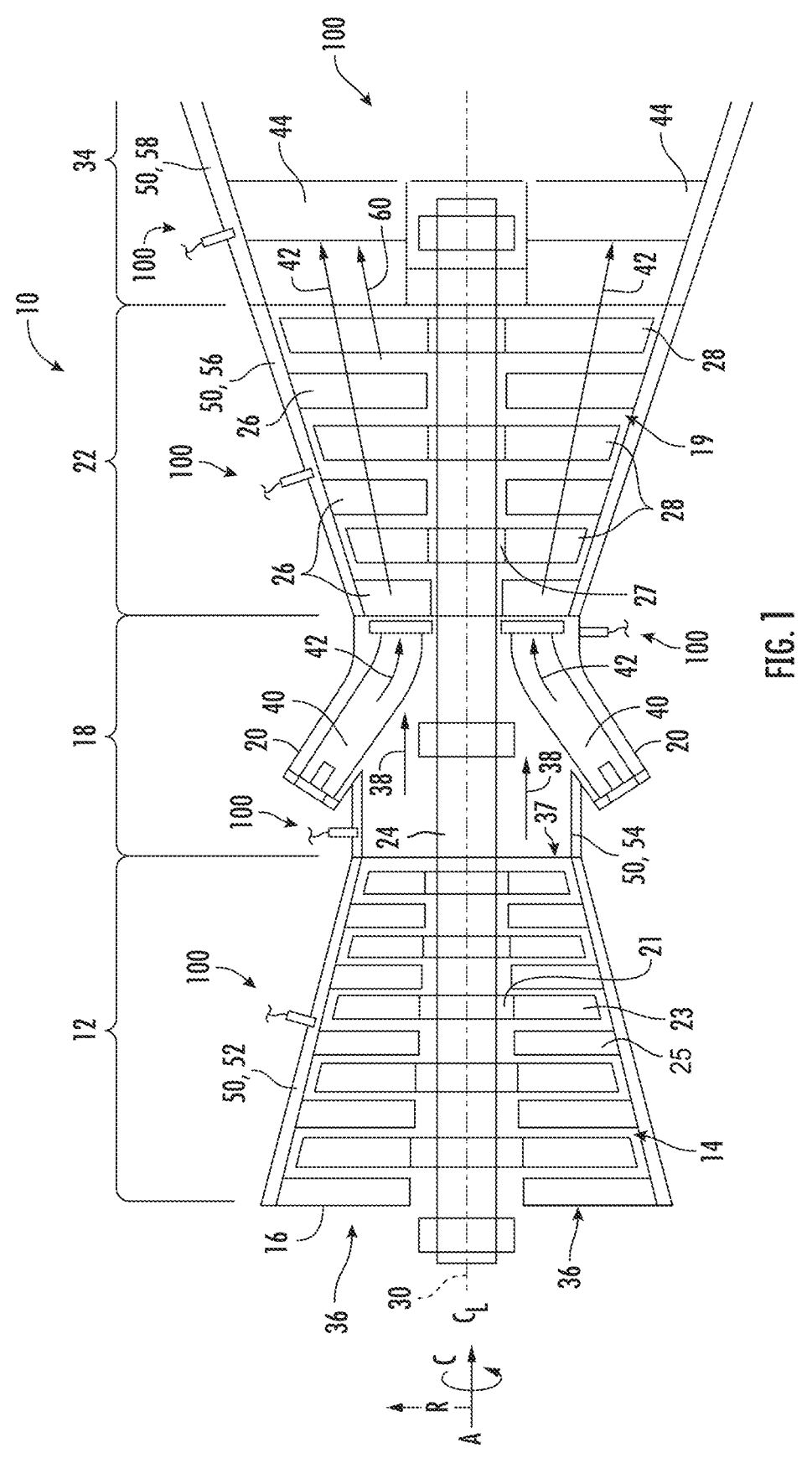
FIG. 1 is a schematic illustration of a turbomachine in accordance with embodiments of the present disclosure.

Reference now will be made in detail to embodiments of the present turbomachines and thermocouple support assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of an electric current (e.g., as through a thermocouple). The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

Here and throughout the specification and claims, range limitations can be combined and interchanged. Such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial and/or land-based gas turbine unless otherwise specified in the claims. For example, the thermocouple support assembly as described herein may be used in any type of turbomachine including but not limited to a steam turbine, an aircraft gas turbine, or a marine gas turbine.

As shown, the gas turbine 10 generally includes a compressor section 12. The compressor section 12 includes a compressor 14. The compressor includes an inlet 16 that is disposed at an upstream end of the gas turbine 10. The gas turbine 10 further includes a combustion section 18 having one or more combustors 20 disposed downstream from the compressor section 12. The gas turbine further includes a turbine section 22 that is downstream from the combustion section 18. The turbine section 22 may include a turbine 19. A shaft 24 extends generally axially through the gas turbine 10.

The compressor section 12 may generally include a plurality of rotor disks 21 and a plurality of rotor blades 23 extending radially outwardly from and connected to each rotor disk 21. Each rotor disk 21 in turn may be coupled to or form a forward portion of the shaft 24 that extends through the compressor section 12. The compressor section 12 further includes a compressor casing 52 that circumferentially surrounds the forward portion of the shaft 24 and the rotor blades 23. A plurality of stator vanes 25 may extend radially inward from the compressor casing 52. The rotor blades 23 and the stator vanes 25 may be arranged in an alternating pattern to define a plurality of compressor stages.

The turbine section 22 may generally include a plurality of rotor disks 27 and a plurality of rotor blades 28 extending radially outwardly from and being interconnected to each rotor disk 27. Each rotor disk 27 in turn may be coupled to or form an aft portion of the shaft 24 that extends through the turbine section 22. The turbine section 22 further includes a turbine casing 56 that circumferentially surrounds the aft portion of the shaft 24 and the rotor blades 28. The turbine section 22 may include stationary nozzles 26 extending radially inward from the turbine casing 56. The rotor blades 28 and stationary nozzles 26 may be arranged in an alternating pattern to define a plurality of turbine stages along an axial centerline 30 of gas turbine 10.

In operation, ambient air 36 or other working fluid is drawn into the inlet 16 of the compressor 14 and is progressively compressed to provide a compressed air 38 to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work. The combustion gases 42 exit the turbine section 22 as exhaust gases 60, and the exhaust gases 60 flow through the exhaust diffuser 34 across a plurality of struts 44 that are disposed within the exhaust diffuser 34.

The gas turbine 10 may define a cylindrical coordinate system having an axial direction A extending along the axial centerline 30, a radial direction R perpendicular to the axial centerline 30, and a circumferential direction C extending around the axial centerline 30.

A gas turbine casing 50 may house (e.g., surround, encompass, and/or encase) the various components of the gas turbine 10. For example, the gas turbine casing 50 may at least partially house the compressor 14 and the turbine 19. The gas turbine casing 50 may include a compressor casing 52, a compressor discharge casing 54, a turbine casing 56, and an exhaust diffuser casing 58. The compressor casing 52 may surround the compressor 14, a forward portion of the shaft 24, and the rotor blades 23. The compressor discharge casing 54 may partially house the combustors 20 and may receive compressed air 38 from an outlet 37 of the compressor 14. The turbine casing 56 may surround the turbine 19, an aft portion of the shaft 24, and the rotor blades 28. The exhaust diffuser casing 58 may surround an end of the shaft 24, and the struts 44 may be coupled to the exhaust diffuser casing 58.

As illustrated, one or more thermocouple support assemblies 100 may be disposed in the gas turbine casing 50 in one or more of the compressor section 12, the combustion section 18, the turbine section 22, and/or the exhaust diffuser 34. For example, a thermocouple support assembly 100 may be mounted on one or more of the compressor casing 52, the compressor discharge casing 54, the turbine casing 56, and/or the exhaust diffuser casing 58. The thermocouple support assemblies 100 may advantageously be utilized to measure the temperature of the portion of the gas turbine casing 50 in which they are positioned.

Figure 2:
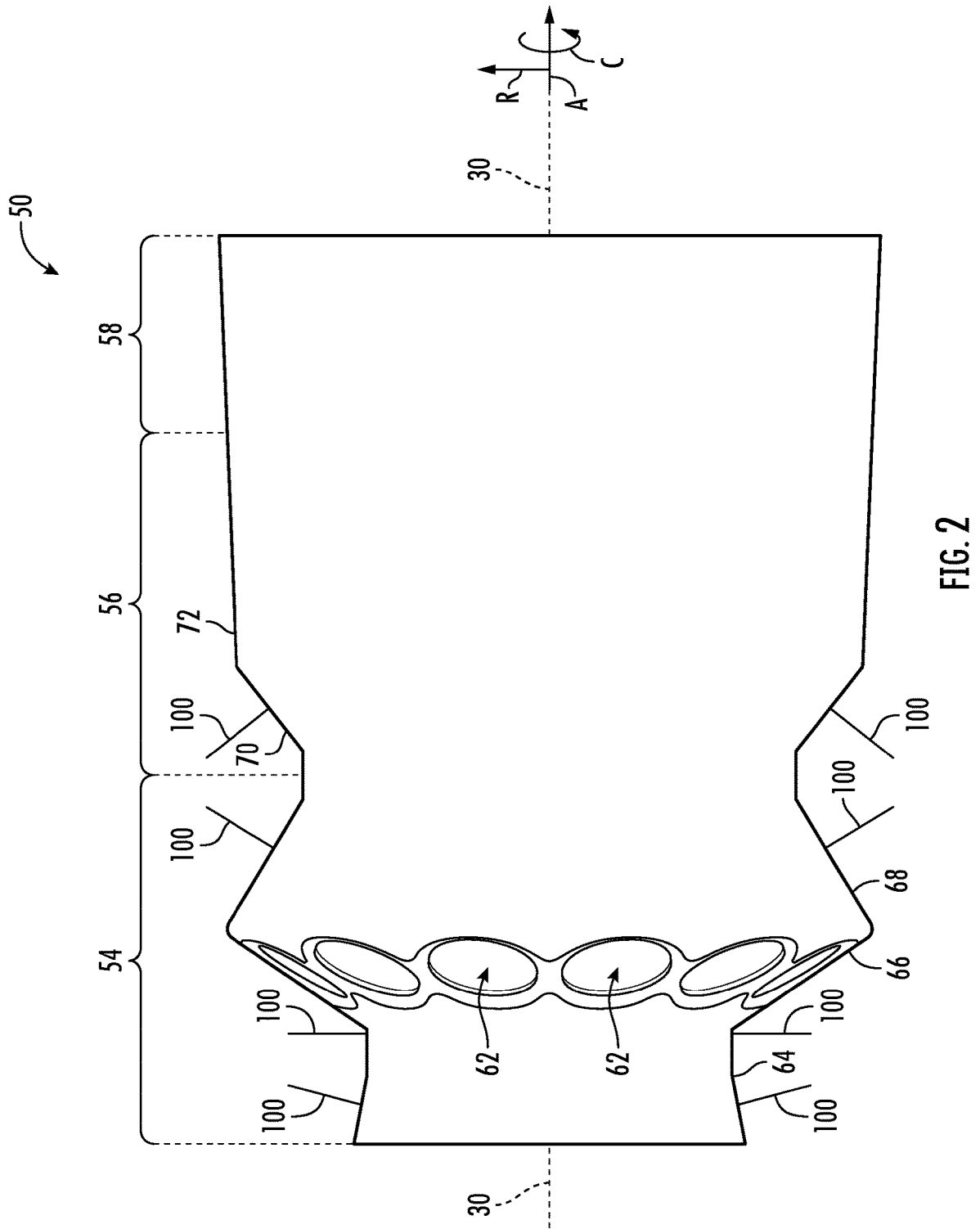
FIG. 2 illustrates a side view of a portion of a gas turbine casing in accordance with embodiments of the present disclosure.

Referring now to FIG. 2, a side view of a portion of a gas turbine casing 50 is illustrated in accordance with embodiments of the present disclosure. As shown, the compressor discharge casing 54 (e.g., the portion of the gas turbine casing that receives compressed air from the compressor 14 and provides the compressed air to one or more combustors 20) may define a plurality of combustion can openings 62 circumferentially spaced apart from one another. A combustor 20 (or combustion can) may be inserted into each combustion can opening 62 and coupled to the compressor discharge casing 54 (e.g., via a plurality of fasteners).

As illustrated, one or more thermocouple support assemblies 100 may be mounted to the compressor discharge casing 54 forward of the plurality of combustion can openings 62 (e.g., immediately aft of the outlet 37 of the compressor 14 as shown in FIG. 1). Additionally, or alternatively, one or more thermocouple support assemblies 100 may be mounted to the compressor discharge casing 54 aft of the plurality of combustion can openings 62 (e.g., immediately forward of an inlet to the turbine 19 as shown in FIG. 1). For example, the compressor discharge casing 54 may include, in an axially sequential order (e.g., from forward to aft), an axial portion 64, a radially diverging portion 66, and a radially converging portion 68. The combustion can openings 62 may be defined in the radially diverging portion 66. One or more thermocouple support assemblies 100 may be mounted to the axial portion 64 and/or the radially converging portion 68 of the compressor discharge casing 54.

In many embodiments, one or more thermocouple support assemblies 100 may be coupled to the turbine casing 56. For example, the turbine casing may include, in an axially sequential order (e.g., from forward to aft), a first radially diverging portion 70 and a second radially diverging portion 72. The first radially diverging portion 70 may be axially shorter than the second radially diverging portion 72. The first radially diverging portion 70 may diverge radially outwardly as the turbine casing 56 extends axially at a rate that is greater than the second radially diverging portion 72. In such embodiments, the thermocouple support assembly 100 may be mounted to the first radially diverging portion 70 of the turbine casing 56.

Figure 3:
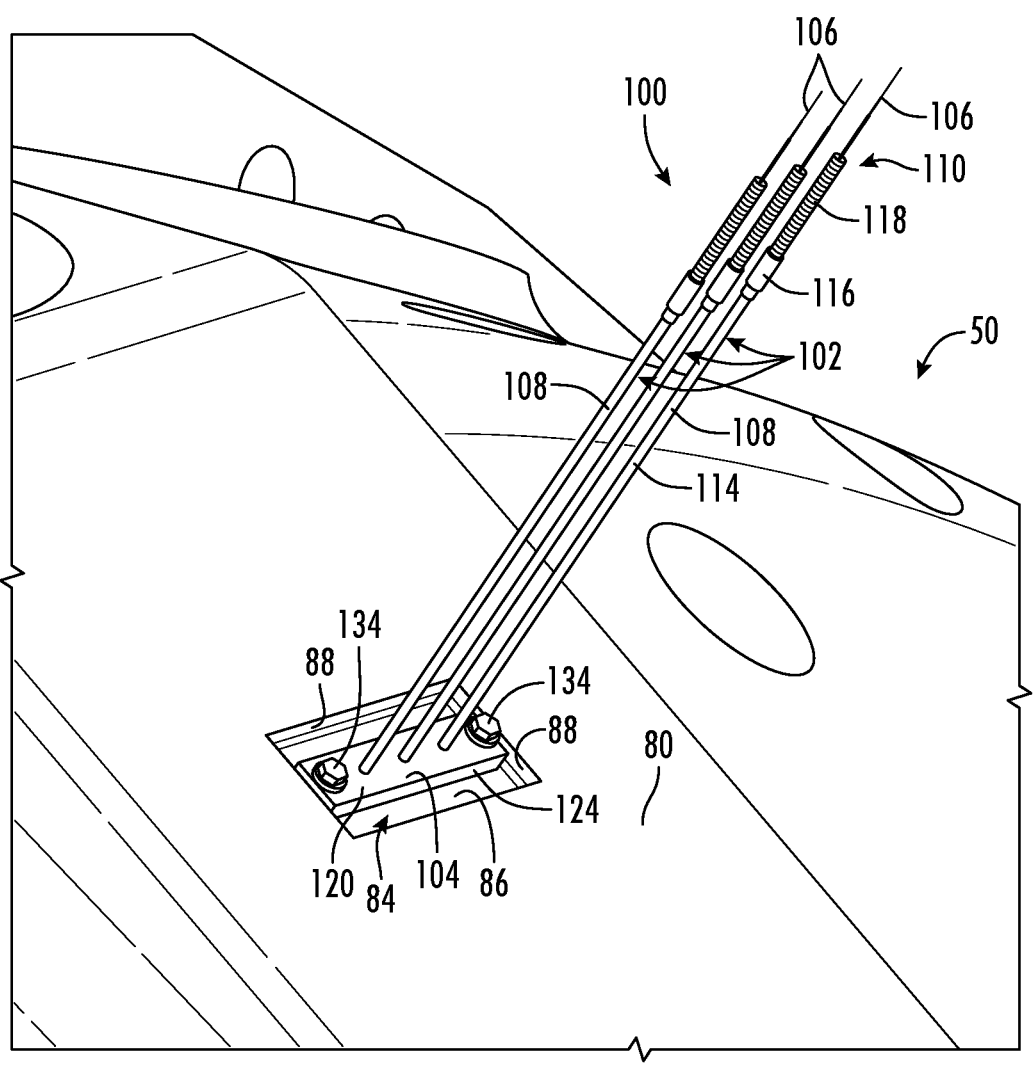
FIG. 3 illustrates an enlarged perspective view of a gas turbine casing having a thermocouple support assembly mounted thereto in accordance with embodiments of the present disclosure.

Referring now to FIG. 3, an enlarged perspective view of a gas turbine casing 50 having a thermocouple support assembly 100 mounted thereto is illustrated in accordance with embodiments of the present disclosure. In exemplary embodiments, the thermocouple support assembly 100 may include a thermocouple 102 and a support plate 104 to which the thermocouple 102 is coupled.

In exemplary embodiments, as shown, the thermocouple support assembly 100 may include a plurality of thermocouples 102 coupled to the support plate 104. For example, in the illustrated embodiments, the thermocouple support assembly 100 may include a set of three thermocouples 102. The plurality of thermocouples 102 may be advantageous over, e.g., a singular thermocouple because multiple thermocouples allow for verification that the temperature measurements are accurate. For example, each thermocouple 102 in the plurality of thermocouples may verify that the temperature reading from the other thermocouples is accurate. Additionally, the use of the plurality of thermocouples 102 is advantageous because, in the event of one or more thermocouples failing or breaking, the other thermocouples may continue to monitor the temperature of the gas turbine casing 50.

Particularly, each thermocouple 102 may include a pair of wires 106 surrounded by a protective sheath 108. The pair of wires 106 may be two dissimilar metallic wires joined together to form a junction, and when the junction is heated or cooled, a voltage may be generated in the pair of wires 106 that corresponds to the temperature. The protective sheath 108 may be generally shaped as a hollow cylinder, and the protective sheath 108 may be a rigid material (such as a metal) that surrounds and protects the pair of wires 106.

As shown, the gas turbine casing 50 may define an exterior surface 80, and the thermocouple support assembly 100 may be coupled to the exterior surface 80 of the gas turbine casing 50 for monitoring a temperature of the gas turbine casing 50. Particularly, the exterior surface 80 of the gas turbine casing 50 includes a recess 84 having a flat surface 86 and side walls 88. The flat surface 86 may be planar (e.g., not including any curvatures or contours), and the side walls 88 may extend generally perpendicularly from the flat surface 86. The recess 84 may be generally rectangularly shaped in many embodiments. However, in other embodiments, the recess 84 may have any suitable shape.

As illustrated, the support plate 104 may be positioned in the recess 84 and coupled to the gas turbine casing 50 such that an inner surface 122 of the support plate 104 and the junction end 112 of the protective sheath 108 contact the flat surface 86. In exemplary embodiments, at least one fastener 134 may couple the support plate 104 to the gas turbine casing 50. For example, the at least one fastener 134 may threadably couple the support plate 104 to the gas turbine casing 50. The at least one fastener 134 may extend through the support plate 104 and into the gas turbine casing 50 to removably couple the support plate 104 to the gas turbine casing 50.

Figures 4, 5:
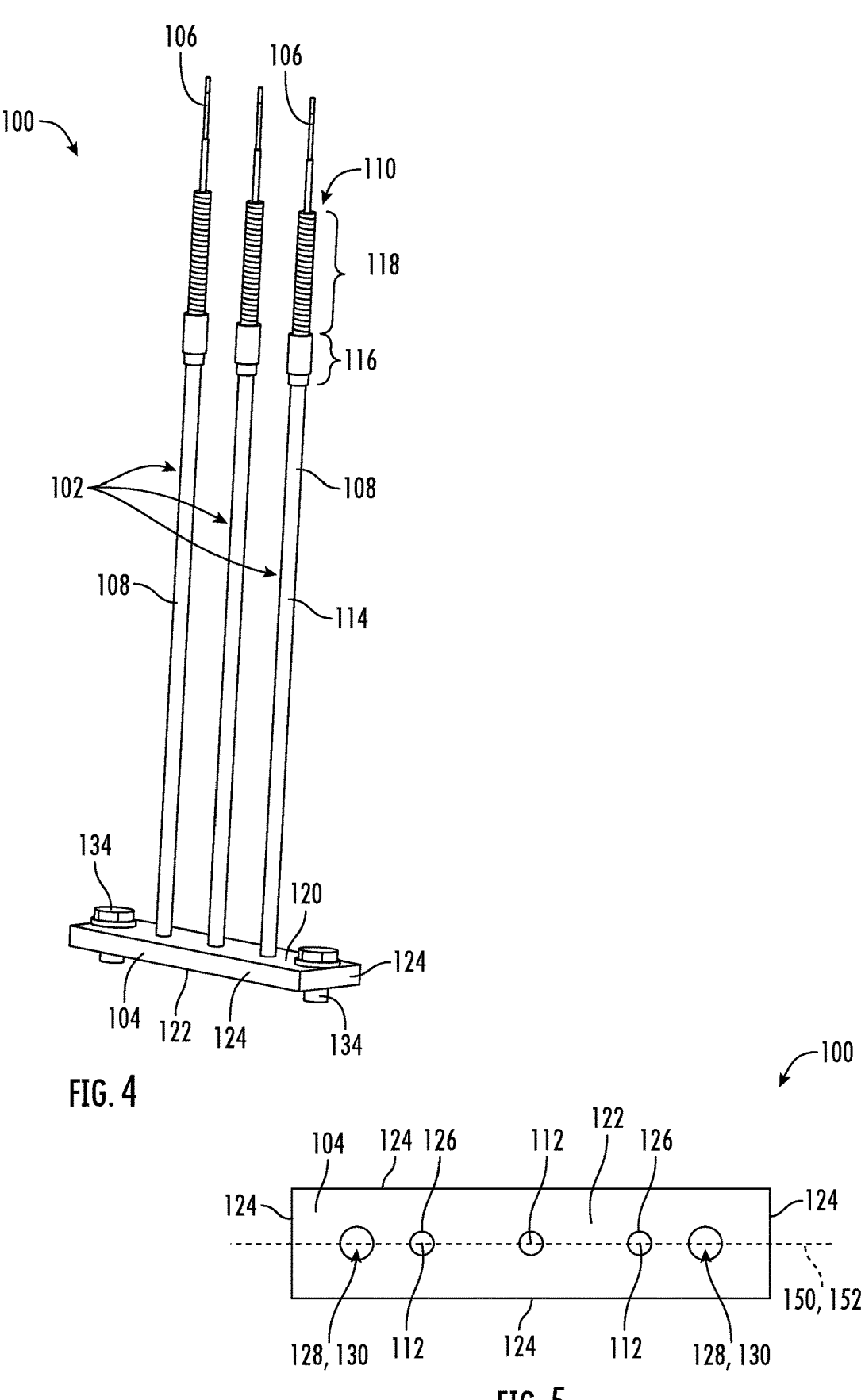
FIG. 4 illustrates a perspective view of a thermocouple support assembly in accordance with embodiments of the present disclosure.
FIG. 5 illustrates a planar view of a thermocouple support assembly in accordance with embodiments of the present disclosure.
Figures 6, 7:
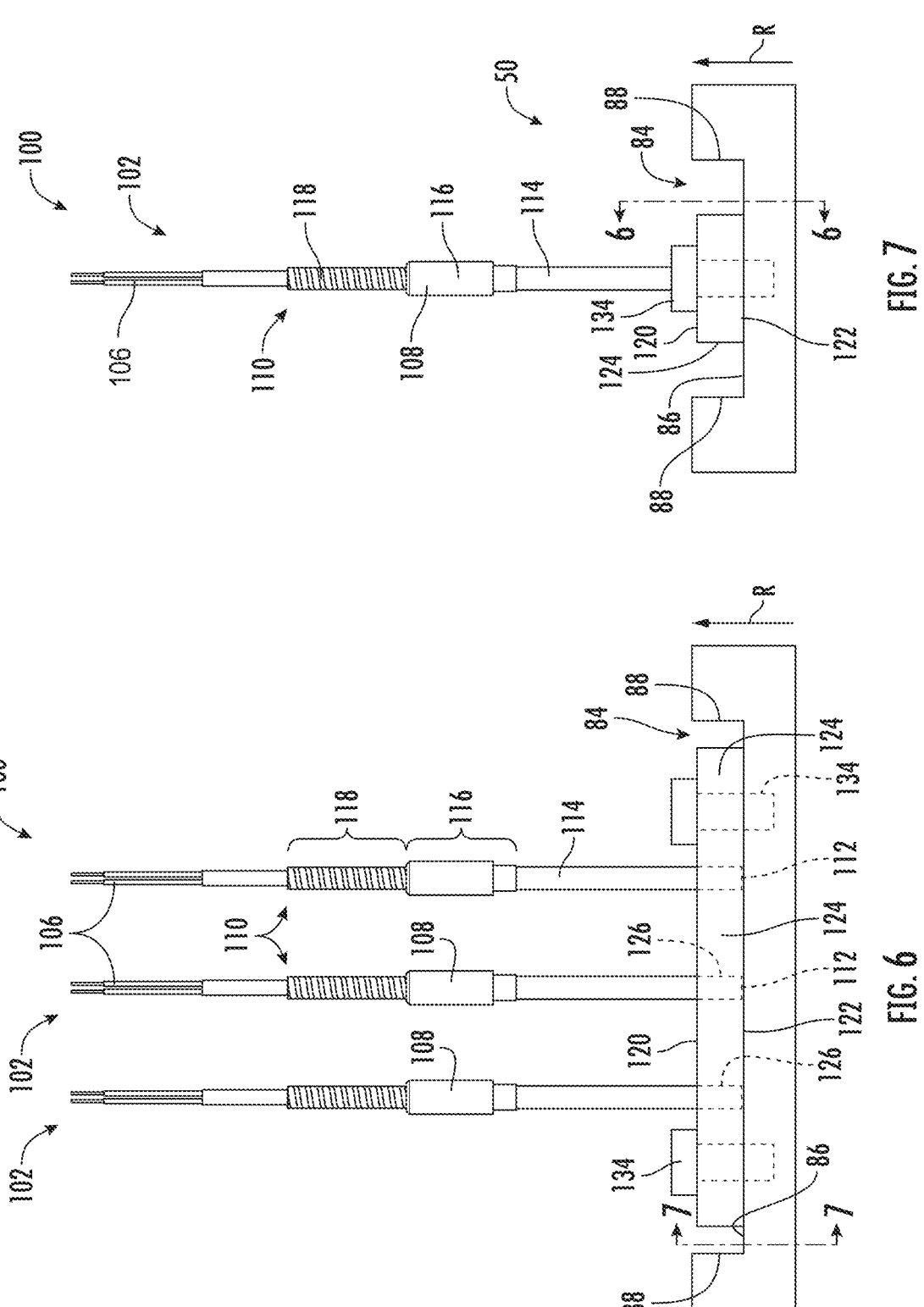
FIG. 6 illustrates a cross-sectional side view of a gas turbine casing having a thermocouple support assembly coupled thereto in accordance with embodiments of the present disclosure.
FIG. 7 illustrates a cross-sectional side view of a gas turbine casing having a thermocouple support assembly coupled thereto in accordance with embodiments of the present disclosure.

Reference will now be made to FIGS. 4 through 7 collectively, which each illustrate various aspects of the present invention. For example, FIG. 4 illustrates a perspective view of the thermocouple support assembly 100. FIG. 5 illustrates a planar view of the thermocouple support assembly 100. FIGS. 6 and 7 each illustrate a different cross-sectional side view of the gas turbine casing 50 having the thermocouple support assembly 100 coupled thereto.

In exemplary embodiments, protective sheath 108 may extend from a connection end 110 to a junction end 112 (FIG. 5). The protective sheath 108 may include a threaded portion 118, a cylindrical portion 114, and a crimp portion 116 disposed between the threaded portion 118 and the cylindrical portion 114. The threaded portion 118 may extend from the connection end 110 to the crimp portion 116. The crimp portion 116 may extend from the threaded portion 118 to the cylindrical portion 114. The cylindrical portion 114 may extend from the crimp portion 116 to the junction end 112. The junction end 112 of the protective sheath 108 may be flat (or planar) and may be contact a measurement surface (e.g., the exterior surface 80 of the gas turbine casing 50). The protective sheath 108 may interface with the pair of wires 106 (either through direct or indirect contact), such that junction end 112 of the protective sheath 108 may directly contact the measurement surface (e.g., the gas turbine casing 50), and the pair of wires 106 may measure the temperature of the gas turbine casing 50.

In exemplary embodiments, the support plate 104 may be shaped as a rectangular prism (e.g., a cuboid or six sided prism). For example, the support plate may include an outer surface 120 and an inner surface 122 spaced apart from one another. The outer surface 120 and the inner surface 122 may be generally parallel to one another. Side surfaces 124 may extend between the outer surface 120 and the inner surface 122. The side surfaces 124 may be generally perpendicular to both the inner surface 122 and the outer surface 120.

In many embodiments, the support plate 104 may define a plurality of apertures 126 extending between the outer surface 120 and the inner surface 122. Each aperture of the plurality of apertures may be a generally cylindrically shaped hole that extends through the support plate 104 and into which the protective sheath 108 may be inserted. In exemplary embodiments, as shown in FIG. 5, each aperture 126 of the plurality of apertures may be centered on a common axis 150. For example, the apertures 126 may each have a circular cross-sectional shape, and the center of the circular cross-sectional shape may be disposed along the common axis 150. In particular embodiments, as shown, the common axis may be an axial centerline 152 of the support plate 104, which advantageously increases the structural stability of the thermocouple support assembly 100 and thus increases the resistance of the thermocouple support assembly 100 to operational vibrations.

Additionally, in various embodiments, the support plate 104 may further define at least one mounting hole 128 extending between the inner surface 122 and the outer surface 120. For example, the support plate 104 may define a first mounting hole 130 and a second mounting hole 130. Each mounting hole 130 may be a generally cylindrically shaped hole that extends through the support plate 104 and through which a fastener 134 may be inserted to couple the support plate 104 to the gas turbine casing 50. The mounting holes 130 may have a greater diameter than each of the plurality of apertures 126, such that a fastener 134 (such as a threaded fastener) having a larger diameter than the protective sheath 108 of the thermocouple 102 may extend through the mounting hole 130 and into the gas turbine casing 50, thereby coupling (e.g., threadably coupling) the thermocouple support assembly 100. This may be advantageous over, e.g., threadably coupling the protective sheath 108 directly to the gas turbine casing 50 because the fasteners 134 may be larger than the protective sheath 108, thereby providing a stronger coupling force that is resistant to the vibrations of the gas turbine 10.

In some embodiments, as shown, the at least one mounting hole 128 may be centered on the common axis 150 (e.g., the axial centerline 152 of the support plate 104). In exemplary embodiments, both the first mounting hole 130 and the second mounting hole 130 may be centered on the common axis 150 on either side of the plurality of apertures 126. For example, the plurality of apertures 126 may be disposed between the mounting holes 130 on the common axis 150.

In exemplary embodiments, the protective sheath 108 may extend through the aperture 126 such that the junction end 112 is flush with the inner surface 122 of the support plate 104. Particularly, the cylindrical portion 114 of the protective sheath 108 may extend through the aperture 126 such that the junction end 112 is flush with the inner surface 122 of the support plate 104 (i.e., the junction end 112 and the inner surface 122 form continuous surfaces). For example, the junction end 112 may not be recessed or protruding from the inner surface 122. Stated otherwise, the inner surface 122 may extend within a plane, and the junction end 112 of the protective sheath 108 may be disposed in the plane. As such, when the fasteners 134 are tightened, the inner surface 122 and the junction end 112 of each thermocouple 102 may be forced into contact with the exterior surface 80 of the gas turbine casing 50 (e.g., the flat surface 86 of the recess 84).

In exemplary embodiments, the protective sheath 108 of the thermocouple 102 may be fixedly coupled to the support plate 104. Particularly, the cylindrical portion (including the junction end 112) may be fixedly coupled (e.g., welded) to the support plate 104. For example, the protective sheath 108 may be welded to the support plate 104, such that the thermocouples 102 may not be removed from the support plate 104 without destructive means. Fixedly coupling the thermocouples 102 to the support plate 104 advantageously ensures that the thermocouples 102 will not become decoupled from the support plate 104 during operation of the gas turbine 10.

In certain embodiments, the protective sheath 108 of the thermocouple 102 may form an interference fit with the support plate 104 within the aperture 126. In such embodiments, as shown, the thermocouple 102 may be cantilevered from the support plate 104 (e.g., coupled to the support plate 104 on only one end). For example, the cylindrical portion 114 (including the junction end 112) may be coupled to the support plate 104. Particularly, the cylindrical portion 114 of the protective sheath 108 may form an interference fit with the support plate 104 within the aperture 126. For example, the thermocouple 102. may be held in place via an interference fit between the protective sheath 108 and the support plate 104. An interference fit (otherwise known as a press fit or friction fit) is a fit between two parts in which the external dimension of one part slightly exceeds the internal dimension of the part into which it is designed to fit. For example, in the present case, the dimensions of the external surface of the protective sheath 108 may slightly exceed the diameter of the aperture 126 in which it is positioned.

The thermocouple support assembly 100 described hereinabove is advantageously resistant to vibrations experienced by the gas turbine casing 50 during operation of the gas turbine 10. Additionally, the thermocouple support assembly 100 may advantageously be removably coupled to the gas turbine casing 50, which allows the thermocouple support assembly 100 to be inspected, removed, or replaced as necessary. While the thermocouple support assembly 100 is removably couplable to the gas turbine casing 50, the thermocouple support assembly 100 may provide for increased connection strength and vibration resistance, thereby maintaining contact between the thermocouples 102 and the gas turbine casing 50 during operation of the gas turbine 10. The redundancy of having a set of three thermocouples 102 ensures that accurate temperature monitoring can continue during operation of the gas turbine 10, even if one of the thermocouples 102 malfunctions or fails.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A turbomachine comprising: a compressor disposed in a compressor section, a turbine disposed in a turbine section, and a combustion section disposed between the compressor section and the turbine section; a gas turbine casing at least partially housing the compressor and the turbine, the gas turbine casing defining an exterior surface; a thermocouple support assembly coupled to the exterior surface of the gas turbine casing, the thermocouple support assembly comprising: a thermocouple comprising a protective sheath, the protective sheath extending from a connection end to a junction end; and a support plate having an outer surface and an inner surface and defining an aperture that extends between the outer surface and the inner surface, wherein the protective sheath extends through the aperture such that the junction end is flush with the inner surface of the support plate.

The turbomachine as in one or more of these clauses, wherein the gas turbine casing includes a compressor casing, a compressor discharge casing, a turbine casing, and an exhaust diffuser casing, and wherein the thermocouple support assembly is coupled to at least one of the compressor casing, the compressor discharge casing, the turbine casing, and the exhaust diffuser casing.

The turbomachine as in one or more of these clauses, wherein the exterior surface of the gas turbine casing includes a recess having a flat surface and side walls, and wherein the support plate is positioned in the recess and coupled to the gas turbine casing such that the inner surface of the support plate and the junction end of the protective sheath contact the flat surface.

The turbomachine as in one or more of these clauses, wherein the support plate further defines at least one mounting hole extending between the inner surface and the outer surface; and wherein at least one fastener extends through the at least one mounting hole to couple the support plate to the gas turbine casing.

The turbomachine as in one or more of these clauses, wherein the thermocouple is a first thermocouple in a plurality of thermocouples, each thermocouple in the plurality of thermocouples having a respective protective sheath and extending between a respective connection end and a respective junction end, wherein the support plate defines a plurality of apertures, and wherein each thermocouple in the plurality of thermocouples extends through a respective aperture such that the respective junction end is flush with the inner surface of the support plate.

The turbomachine as in one or more of these clauses, wherein the plurality of apertures is centered on a common axis, the common axis being an axial centerline of the support plate.

The turbomachine as in one or more of these clauses, wherein the plurality of thermocouples is a set of three thermocouples, and the plurality of apertures is a set of three apertures.

The turbomachine as in one or more of these clauses, wherein the support plate further defines at least one mounting hole extending between the inner surface and the outer surface, the at least one mounting hole being centered on the common axis.

The turbomachine as in one or more of these clauses, wherein the support plate is shaped as a rectangular prism.

The turbomachine as in one or more of these clauses, wherein the thermocouple is cantilevered from the support plate.

The turbomachine as in one or more of these clauses, wherein the protective sheath of the thermocouple is fixedly coupled to the support plate.

A thermocouple support assembly configured to mount on a gas turbine casing, the thermocouple support assembly comprising: a thermocouple comprising a protective sheath, the protective sheath extending from a connection end to a junction end; and a support plate having an outer surface and an inner surface and defining an aperture that extends between the outer surface and the inner surface, wherein the protective sheath extends through the aperture such that the junction end is flush with the inner surface of the support plate.

The thermocouple support assembly as in one or more of these clauses, wherein the thermocouple is a first thermocouple in a plurality of thermocouples, each thermocouple in the plurality of thermocouples having a respective protective sheath and extending between a respective connection end and a respective junction end; wherein the support plate defines a plurality of apertures; and wherein each thermocouple in the plurality of thermocouples extends through a respective aperture such that the respective junction end is flush with the inner surface of the support plate.

The thermocouple support assembly as in one or more of these clauses, wherein the plurality of apertures is centered on a common axis, the common axis being an axial centerline of the support plate.

The thermocouple support assembly as in one or more of these clauses, wherein the plurality of thermocouples is a set of three thermocouples; and wherein the plurality of apertures is a set of three apertures.

The thermocouple support assembly as in one or more of these clauses, wherein the support plate further defines at least one mounting hole extending between the inner surface and the outer surface.

The thermocouple support assembly as in one or more of these clauses, wherein the at least one mounting hole is centered on the common axis.

The thermocouple support assembly as in one or more of these clauses, wherein the support plate is shaped as a rectangular prism.

The thermocouple support assembly as in one or more of these clauses, wherein the thermocouple is cantilevered from the support plate.

The thermocouple support assembly as in one or more of these clauses, wherein the protective sheath of the thermocouple is fixedly coupled to the support plate.

What is claimed is:

1. A turbomachine comprising:
a compressor disposed in a compressor section, a turbine disposed in a turbine section, and a combustion section disposed between the compressor section and the turbine section;
a gas turbine casing at least partially housing the compressor and the turbine, the gas turbine casing defining an exterior surface, wherein the exterior surface of the gas turbine casing includes a recess having a flat surface and side walls; and
a thermocouple support assembly coupled to the exterior surface of the gas turbine casing, the thermocouple support assembly comprising:
a thermocouple comprising a protective sheath, the protective sheath extending from a connection end to a junction end; and
a support plate having an outer surface and an inner surface and defining an aperture that extends between the outer surface and the inner surface, wherein the protective sheath extends through the aperture such that the junction end is flush with the inner surface of the support plate, and wherein the support plate is positioned in the recess and coupled to the gas turbine casing such that the inner surface of the support plate and the junction end of the protective sheath contact the flat surface.

2. The turbomachine as in claim 1, wherein the gas turbine casing includes a compressor casing, a compressor discharge casing, a turbine casing, and an exhaust diffuser casing, and wherein the thermocouple support assembly is coupled to at least one of the compressor casing, the compressor discharge casing, the turbine casing, and the exhaust diffuser casing.

3. The turbomachine as in claim 1, wherein the support plate further defines at least one mounting hole extending between the inner surface and the outer surface; and wherein at least one fastener extends through the at least one mounting hole to couple the support plate to the gas turbine casing.

4. The turbomachine as in claim 1, wherein the support plate is shaped as a rectangular prism.

5. The turbomachine as in claim 1, wherein the thermocouple is cantilevered from the support plate.

6. The turbomachine as in claim 1, wherein the protective sheath of the thermocouple is fixedly coupled to the support plate.

7. The turbomachine as in claim 1, wherein the thermocouple is a first thermocouple in a plurality of thermocouples, each thermocouple in the plurality of thermocouples having a respective protective sheath and extending between a respective connection end and a respective junction end, wherein the support plate defines a plurality of apertures, and wherein each thermocouple in the plurality of thermocouples extends through a respective aperture such that the respective junction end is flush with the inner surface of the support plate.

8. The turbomachine as in claim 7, wherein the plurality of apertures is centered on a common axis, the common axis being an axial centerline of the support plate.

9. The turbomachine as in claim 8, wherein the plurality of thermocouples is a set of three thermocouples, and the plurality of apertures is a set of three apertures.

10. The turbomachine as in claim 8, wherein the support plate further defines at least one mounting hole extending between the inner surface and the outer surface, the at least one mounting hole being centered on the common axis.

11. A thermocouple support assembly configured to mount on a gas turbine casing, the thermocouple support assembly comprising:
a thermocouple comprising a protective sheath, the protective sheath extending from a connection end to a junction end; and
a support plate having an outer surface and an inner surface and defining an aperture that extends between the outer surface and the inner surface, wherein the protective sheath extends through the aperture such that the junction end is flush with the inner surface of the support plate, and wherein the protective sheath of the thermocouple is welded to the support plate.

12. The thermocouple support assembly as in claim 11, wherein the support plate is shaped as a rectangular prism.

13. The thermocouple support assembly as in claim 11, wherein the thermocouple is cantilevered from the support plate.

14. The thermocouple support assembly as in claim 11, wherein the thermocouple is a first thermocouple in a plurality of thermocouples, each thermocouple in the plurality of thermocouples having a respective protective sheath and extending between a respective connection end and a respective junction end; wherein the support plate defines a plurality of apertures; and wherein each thermocouple in the plurality of thermocouples extends through a respective aperture such that the respective junction end is flush with the inner surface of the support plate.

15. The thermocouple support assembly as in claim 14, wherein the plurality of apertures is centered on a common axis, the common axis being an axial centerline of the support plate.

16. The thermocouple support assembly as in claim 15, wherein the plurality of thermocouples is a set of three thermocouples; and wherein the plurality of apertures is a set of three apertures.

17. The thermocouple support assembly as in claim 15, wherein the support plate further defines at least one mounting hole extending between the inner surface and the outer surface.

18. The thermocouple support assembly as in claim 17, wherein the at least one mounting hole is centered on the common axis.

\* \* \* \* \*